Oct. 30, 1956
H. O. LESLIE
2,768,554
OPTICAL DEVICE OF FOLDABLE MATERIAL
Filed Nov. 6, 1952
3 Sheets-Sheet 1
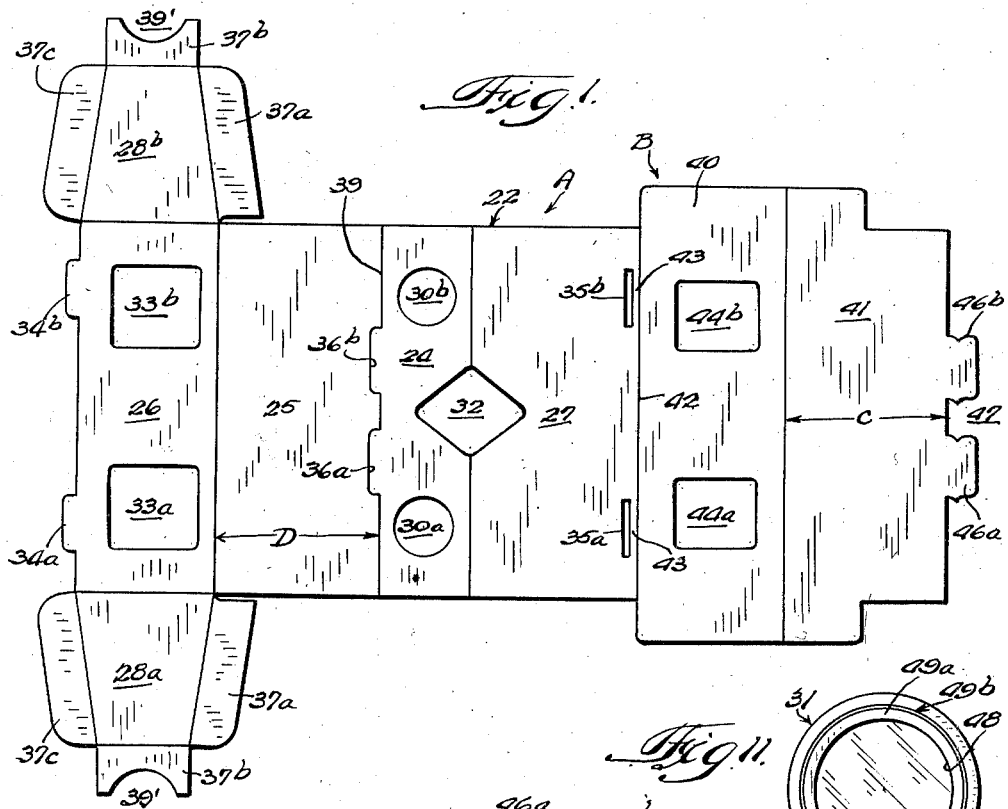
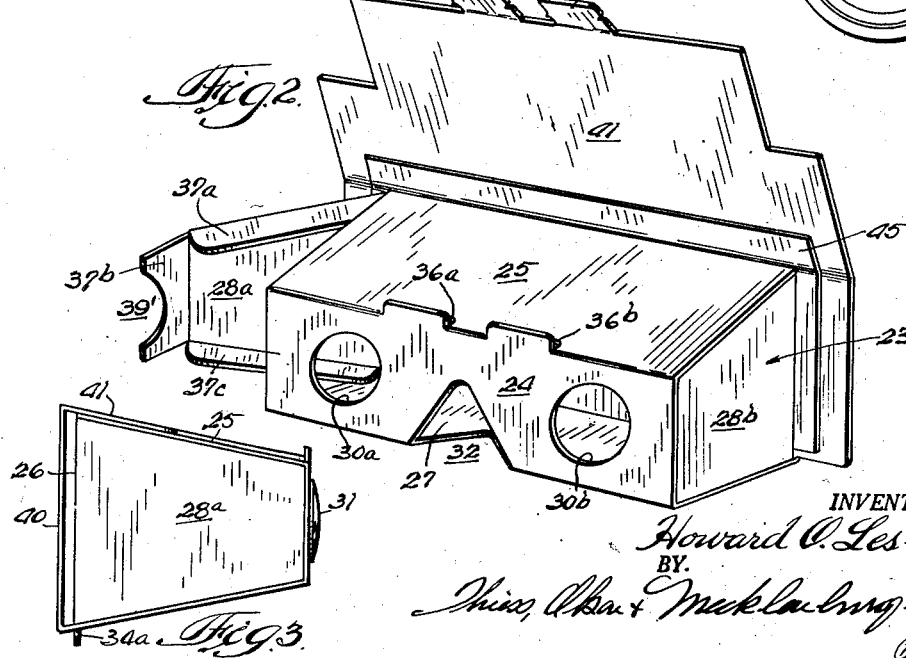
INVENTOR.
Howard O. Leslie
BY.

Oct. 30, 1956 — H. O. LESLIE — 2,768,554
OPTICAL DEVICE OF FOLDABLE MATERIAL
Filed Nov. 6, 1952 — 3 Sheets-Sheet 2
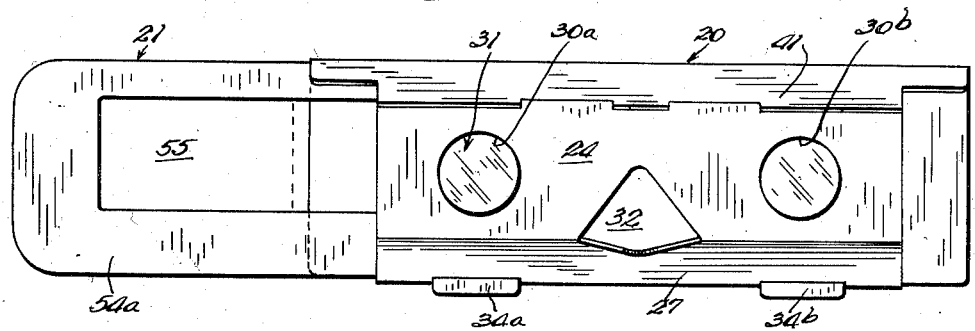
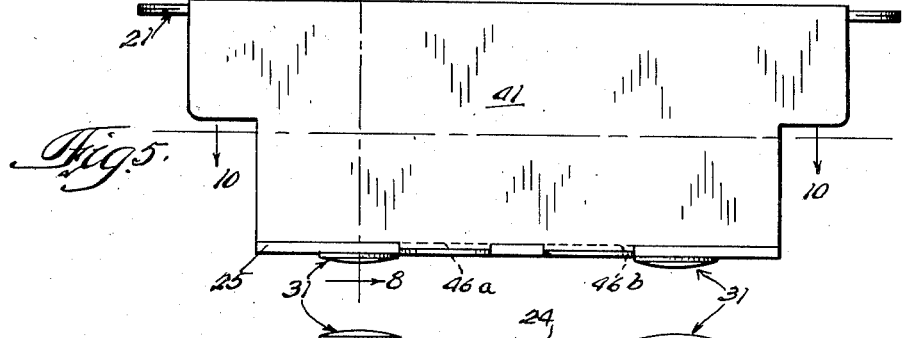
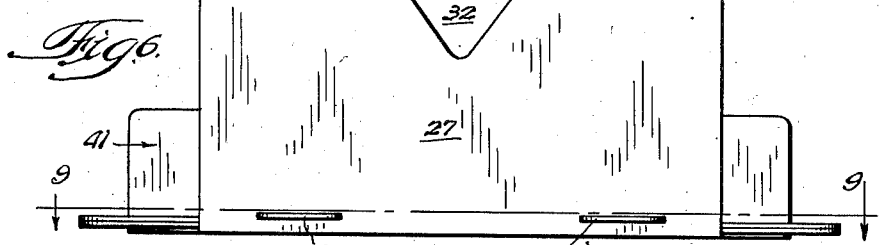
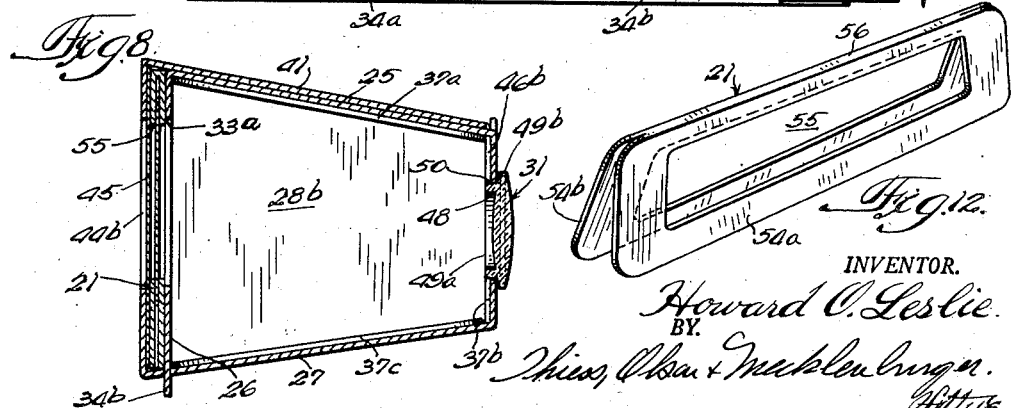
INVENTOR.
Howard O. Leslie
BY Thiess, Olson & Mecklenburgh
Attys.

Oct. 30, 1956　　　　H. O. LESLIE　　　　2,768,554
OPTICAL DEVICE OF FOLDABLE MATERIAL
Filed Nov. 6, 1952　　　　　　　　　　3 Sheets-Sheet 3
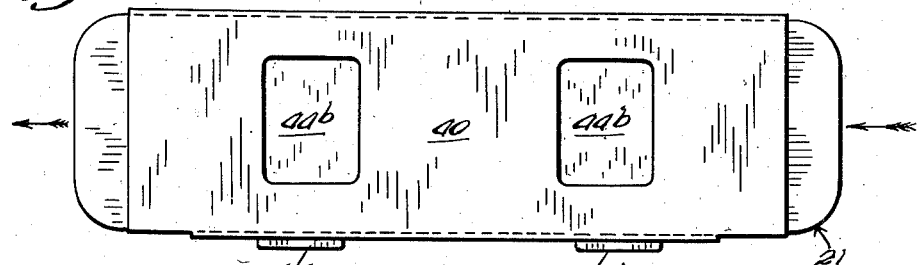
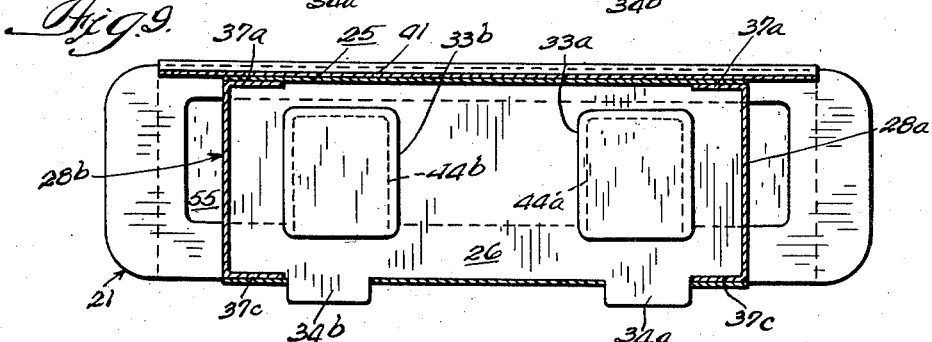
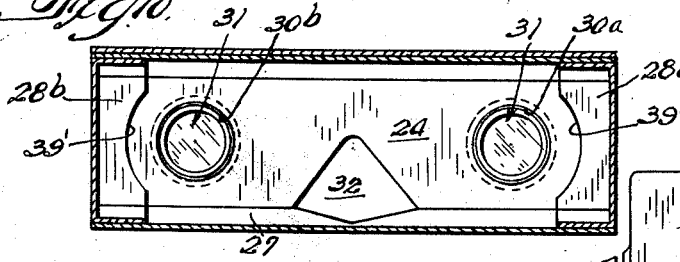
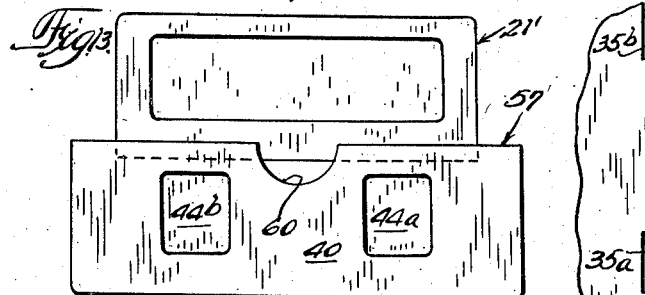
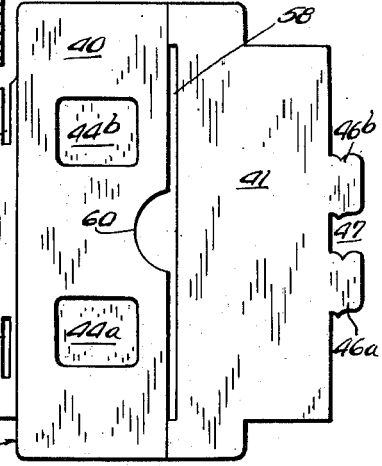
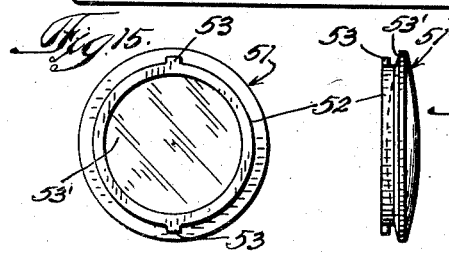
INVENTOR.
Howard O. Leslie.

United States Patent Office 2,768,554
Patented Oct. 30, 1956

2,768,554

OPTICAL DEVICE OF FOLDABLE MATERIAL

Howard O. Leslie, Chicago, Ill., assignor to Real View, Inc., Glencoe, Ill., a corporation of Illinois Application November 6, 1952, Serial No. 319,053

4 Claims. (Cl. 88—29)

This invention relates to an optical device and more particularly to a stereoptic viewer and an image mount therefor.

Various stereoptic viewers, or as currently designated stereo-viewers, have heretofore been proposed; however, due to their costly and complex design or bulky and weighty construction, such viewers have not been readily acceptable by all of the general public.

Thus it is one of the objects of this invention to provide a stereo-viewer and an image mount therefor which is readily collapsible and, when in a collapsed position, assumes a substantially flat sheetlike characteristic thereby enabling it to be readily carried in a pocket or handbag or placed in an envelope for mailing.

It is a further object of this invention to provide a kit containing a collapsible stereo-viewer and an image mount which are of such simple construction that even a child could readily assemble the viewer and mount for viewing.

It is a still further object of this invention to provide a stereo-viewer costing but a fraction of the cost of other viewers presently being sold, yet being almost as effective in operation as the most costly viewers.

It is a still further object of this invention to provide a kit containing a collapsible stereo-viewer and mount therefor which provides a source of keen interest and pleasure to young and old alike and also affords ample opportunity, particularly for children, to improve their dexterity and at the same time learn some of the important facts relating to three dimensional photography.

Further and additional objects will appear from the description, accompanying drawings, and appended claims.

In accordance with one embodiment of this invention, an optical device is provided comprising an apertured foldable body member formed of a sheet of relatively stiff, bendable material and focusing means mounted on said body member and in registration with an aperture formed therein. The body member, when in folded relation, forms an apertured hollow enclosure and, when in an unfolded relation, is substantially flat and sheetlike in character.

For a more complete understanding of this invention reference should be made to the drawings wherein:

Figure 1 is a plan view of the body member when in an unfolded relation;

Fig. 2 is an enlarged perspective view of the body member when in a partially folded relation;

Fig. 3 is an end view of the body member when in folded relation and with the lenses mounted thereon;

Fig. 4 is a back view of the viewer in folded relation with an image mount slidably mounted thereon;

Fig. 5 is a top plan view of the viewer shown in Fig. 4 but with the image mount moved to another position of slidable adjustment;

Fig. 6 is a bottom view of the viewer shown in Fig. 5;

Fig. 7 is a front view of the viewer shown in Fig. 5;

Fig. 8 is an enlarged sectional view taken along line 8—8 of Fig. 5;

Fig. 9 is a sectional view taken along line 9—9 of Fig. 6;

Fig. 10 is a sectional view taken along line 10—10 of Fig. 5;

Fig. 11 is a back view of one of the lenses shown in Fig. 8;

Fig. 12 is a perspective view of an image mount shown in partially folded relation;

Fig. 13 is a front view of a modified form of viewer shown in folded relation;

Fig. 14 is a fragmentary plan layout view of the modified form of viewer shown in Fig. 13; and Figs. 15 and 16 are back and side views, respectively, of a modified form of lens.

Referring now to the drawings and more particularly to Figs. 3 through 6, an optical device for viewing stereoscopic film is shown comprising a collapsible viewer 20 and a detachable image mount 21, slidably mounted within said viewer.

The viewer in this instance comprises a body member 22 formed from a sheet of relatively stiff, bendable material such as cardboard. The body member 22 has a left hand portion A thereof, which, when in a folded position as seen in Fig. 2, is adapted to form a hollow enclosure 23. The enclosure 23 comprises an apertured back section 24, a top section 25, an apertured front section 26, a bottom section 27 and side sections 28a and 28b, as seen more clearly in Fig. 1.

The apertured back section 24 is provided with a pair of apertures 30a and 30b which, in this instance, are spaced approximately 65 mm. apart. The dimension 65 mm. corresponds to the interpupillary distance of an average adult. Mounted within each aperture 30a and 30b is a lens 31 formed of glass or clear plastic material. The function and construction of the lens will be described more fully hereinafter.

A cut-out portion 32 is formed intermediate the foldably connected sections 24 and 27 so that a portion of the cut-out is disposed within each section. The cut-out 32, when the body member portion is in folded relation, is adapted to accommodate the nose of the viewer.

The apertured front section 26, which is foldably connected to top section 25, is provided with a pair of enlarged openings 33a and 33b which are spaced slightly closer together than the apertures 30a and 30b formed in back section 24. Also formed in apertured front section 26 are a pair of tabs 34a and 34b which, when the body member portion is in folded relation, are adapted to extend through a pair of slots 35a and 35b formed in bottom section 27.

The top section 25, which is disposed intermediate sections 24 and 26 and foldably connected thereto, is provided with a pair of spaced slots 36a and 36b formed adjacent the line of connection 39 between sections 24 and 25. The function of the slots 36a and 36b will become apparent hereafter.

The side sections 28a and 28b are of like construction and are foldably connected to opposite sides of apertured front section 26. Each section is provided with a plurality of flaps 37a, 37b, and 37c, which, when the body member portion 22 forms the enclosure 23, as seen in Fig. 2, are folded in the same direction relative to the sides 28a and 28b and frictionally engage the corresponding inside surfaces of the top, back and bottom sections. Flaps 37b are each provided with a cut-out 39' which is of such a shape as to correspond substantially to the adjacent portion of the adjacent lens which projects through one of the apertures formed in back section 24.

The second, or right hand, body member portion B comprises an apertured section 40 which is foldably connected to bottom section 27 of portion A and is adapted, when the second body member portion B is in folded position, to be disposed in spaced substantially parallel relation with respect to the apertured front section 26 of the left hand body member portion A.

The spacing between sections 26 and 40, when the viewer is in folded relation, is determined by the distance 43 the pair of slots 35a and 35b are positioned from the line of connection 42 between sections 27 and 40. The distance 43 is of such size as to enable the image mount 21 to be slidably disposed therein.

A pair of spaced apertures 44a and 44b are formed in section 40 and are adapted to be in substantial registration with the apertures 33a and 33b, respectively, formed in front section 26 when the first body member portion A is in folded relation, as seen in Fig. 2. Apertures 44a and 44b are covered over with a piece of light-diffusing material 45, which in this instance is adhesively secured to a surface of section 40 which is hidden from view when the viewer is in folded relation.

The second body member portion B also comprises a second section 41 which is foldably connected to apertured section 40. Section 41 is provided with a pair of spaced tabs 46a and 46b which are adapted to extend through slots 36a and 36b, respectively, formed in top section 25 of portion A when the viewer is in folded relation.

The opposite sides 47 of the tabs 46a and 46b are non-linear so that once the tabs are inserted through the slots 36a and 36b, formed in top section 25, the tabs will tend to remain in place and thus effect locking of the viewer in folded relation.

The dimension C of section 41, see Fig. 1, is greater than the dimension D of top section 25, so that when the viewer is in folded relation and tabs 46a and 46b are inserted through slots 35a and 35b, respectively, apertured sections 26 and 40 will assume a substantially parallel spaced relation with respect to one another, as heretofore mentioned.

One form of lens 31, as seen more clearly in Figs. 8 and 11, has an annular flange 48 formed on one side thereof. The outer surface 50 of the flange 48 converges a slight amount so that the diameter of the edge 49a thereof is less than the diameter of the inner edge 49b. The diameter of the outer edge 49a in turn is slightly less than the diameter of the apertures 30a and 30b formed in back section 24 so as to enable the edge 49a of the flange to be readily inserted through one of the apertures 30a or 30b. The flange 48 is pushed into the aperture until it becomes wedged therein. This wedging action occurs at the inner edge 49b and thus causes the lens to remain snugly in place within the aperture. In the construction shown in Figs. 3, 5, 6, 8, and 10, the flange 48 is shown inserted through the apertures 30a or 30b from the exposed side of back section 24; however, if desired, the flange 48 may be inserted through the apertures in the opposite direction. The lenses are adapted to bring the sets of stereoscopic film, not shown, which are mounted on the image mount 21, sharply into focus and also to magnify, to a certain extent, the images shown on the film so that the desired three-dimensional effect is experienced by the observer when the mount is positioned on the viewer.

A modified form of lens 51 is shown in Figs. 15 and 16, wherein an annular flange 52, formed on one side thereof, has the outer surface thereof substantially parallel with respect to the axis of the lens. Extending radially from the flange 52 and spaced axially from the adjacent side 53' of the lens are a plurality of lugs 53 which are adapted to lock the aperture-forming edge of section 24 between the lugs and the adjacent side of the lens once the lens has been positioned within the aperture 30a or 30b.

Another modified form of lens, not shown, may be used wherein no transversely extending flange, such as 48 or 52, is required, but instead the surface of the lens, adjacent the aperture 30a or 30b is flat or slightly convex and the outer peripheral edge portion of the lens extends a considerable distance beyond the periphery of the aperture and is adhesively secured to either the exposed or concealed side of back section 24.

The image mount 21 as shown in Fig. 12 is formed of relatively stiff, bendable sheet material and comprises two sections 54a and 54b which are of like shape. Each section is provided with an elongated opening 55. The sections 54a and 54b are integrally connected together along one edge 56 thereof. The mount 21 is adapted to accommodate one or more sets of transparencies which are disposed between the sections 54a and 54b, as seen in Fig. 12. The transparencies forming each set of transparencies are spaced so that they will register with the apertures 33a, 33b, and 44a and 44b formed in the body member. Once the transparencies have been positioned between the folded sections 54a and 54b, the open sides of said sections are adhesively secured together, or a binding tape is positioned thereabout.

A modified form of body member 57 is shown in Figs. 13 and 14, wherein an elongated slot 58 is formed in section 41 and a finger cut-out portion 60 is formed in apertured section 40. The slot 58 is provided so as to enable a slightly modified image mount 21' to be inserted in the viewer from the top, as seen in Fig. 13.

The modified image mount 21', shown in Fig. 13 is substantially the same as mount 21, except it is shorter in its longitudinal length and longer in its lateral dimension and is adapted to accommodate only one set of transparencies. The length of mount 21' is substantially the same as slot 58.

Thus it will be seen that a foldable optical device for viewing stereoscopic film has been provided, which is of simple and inexpensive construction and is adapted, when in its unfolded position, to assume a relatively flat sheet-like character, thereby enabling the device to be readily carried in a pocket, handbag, or placed within an envelope for mailing. Furthermore, the device provides a source of keen interest and pleasure both for young and old, and also enables children, in particular, to improve their dexterity and at the same time learn some of the important facts relating to three dimensional photography.

While several embodiments of this invention are shown above, it will be understood, of course, that the invention is not to be limited thereto, since many further modifications may be made, and it is contemplated, therefore, by the appended claims, to cover any such modifications as fall within the true spirit and scope of this invention.

I claim:

1. An optical device comprising a body member formed of a sheet of relatively stiff bendable material, including a pair of hingedly connected foldable portions, one of said portions, when in a folded relation, forming a hollow enclosure having apertured front and back sections and slotted top and bottom sections, said front section having a segment thereof projecting through a slot formed in said bottom section, when said portion is in folded relation, the second of said body member portions having an apertured section adapted to be disposed in spaced substantially parallel relation with respect to the apertured front section of said one body member portion, when the latter is in folded relation; said second body member portion having a segment thereof overlying said slotted top section and projecting through a slot formed therein to effect interlocking of said segment and top section, when said one body member portion is in folded relation, and focusing means mounted on said apertured back section and disposed within the apertures formed therein.

2. An optical device comprising a body member formed of a sheet of relatively stiff bendable material, including a foldable first portion adapted, when in folded relation, to form a hollow enclosure having apertured front and back sections and slotted top and bottom sections, said front section being provided with a protruding segment for projection through a slot formed in said bottom section when said portion is in folded relation, and a foldable second portion having an apertured first section foldably connected to said first body member portion for disposition in a spaced substantially parallel relation with respect to the apertured front section of said first body member portion, when the latter is in folded relation, said second body member portion having a second section foldably connected to said apertured first section for disposition in overlying relation with respect to said top section and provided with a protruding segment for insertion through a slot formed in said top section to effect locking of said body member portion in folded relation, and focusing means mounted on said apertured back section and in registration with the apertures formed therein.

3. An optical device comprising a collapsible body member formed of a sheet of relatively stiff bendable material, including a pair of hingedly connected foldable portions; one of said portions, when in a folded relation, forming a hollow enclosure having substantially parallel apertured front and back sections, slotted top and bottom sections, and opaque side sections; said front section having a segment thereof projectable through a slot formed in said bottom section adjacent to but spaced from the front edge thereof; the second of said body member portions having an apertured first section foldably connected to the front edge of said bottom section for disposition in spaced substantially parallel relation with respect to said apertured front section to form an image mount-receiving pocket wherein the apertures of said front and apertured first sections are in registered relation; and a second section foldably connected to said first section for disposition in overlying relation with respect to said slotted top section, said second section having a segment thereof projectable within a slot formed in said top section to effect releasable interlocking of said first and second portions in a folded relation; and focusing means mounted on said back section in registration with the aperture formed therein.

4. A stereoscope comprising an elongated blank of flexible sheet material, said blank having transverse fold lines formed therein dividing it into end sections, a central section, and an intermediate section between said central section and each of said end sections; one of said end sections having lateral extensions and a fold line formed between it and each of said lateral extensions, said blank being foldable along said fold lines to form a chamber, with said central section forming one end wall of said chamber, said intermediate sections forming the top and bottom wall thereof, said end sections oppositely overlapping to form the second end wall thereof and said extensions having their free ends secured to said central section to form the side walls thereof; registering light admitting means provided in said end sections and viewing means provided in said central section adapted to be disposed in alinement with said registering light admitting means when said blank is folded into a chamber.

References Cited in the file of this patent

UNITED STATES PATENTS

| 2,131,444 | Lateltin et al. | Sept. 27, 1938 |
| 2,268,529 | Stiles | Dec. 30, 1941 |
| 2,543,240 | Hutchinson | Feb. 27, 1951 |

FOREIGN PATENTS

| 710,240 | Germany | Sept. 8, 1941 |